United States Patent [19]
Fukumoto

[11] 3,969,887
[45] July 20, 1976

[54] ELECTRONICALLY CONTROLLED TIMEPIECES USING LIQUID CRYSTAL DISPLAY ELEMENTS

[75] Inventor: Shigeru Fukumoto, Kobe, Japan

[73] Assignee: Kabushiki Kaisha Suncrux Research Office, Kobe, Japan

[22] Filed: Mar. 6, 1974

[21] Appl. No.: 448,692

[30] Foreign Application Priority Data
Mar. 8, 1973  Japan................................ 48-27260
Mar. 24, 1973  Japan............................... 48-33698

[52] U.S. Cl.............................. 58/50 R; 58/127 R
[51] Int. Cl.²................... G04B 19/30; G04B 19/06
[58] Field of Search..................... 58/50 R, 127 R; 350/160 LC

[56] References Cited
UNITED STATES PATENTS

| | | | |
|---|---|---|---|
| 3,505,804 | 4/1970 | Hofstein | 58/23 BA |
| 3,540,209 | 11/1970 | Zatsky et al. | 58/50 R |
| 3,731,986 | 5/1973 | Fergason | 350/160 LC |
| 3,772,874 | 11/1973 | Lefkowitz | 58/50 R |
| 3,839,857 | 10/1974 | Berets | 58/23 |
| 3,841,083 | 10/1974 | Bergey | 58/50 R |
| 3,861,135 | 1/1975 | Seeger et al. | 58/50 R |

*Primary Examiner*—Edith Simmons Jackmon
*Attorney, Agent, or Firm*—Auslander & Thomas

[57] ABSTRACT

An electronic timepiece comprising a time indicating body which is composed of a multitude of liquid crystal display elements arranged in hour indicating sections and minute indicating sections respectively, said display elements for hour indication being activated to be turned ON one after another, said display elements for minute indication being activated to be turned ON successively and accumulatively in response to the application of controlled electric signals transmitted from an electronic circuitry for driving said display elements, said hour and minute indications creating various display patterns on the surface of said indicating body so that the time is indicated analogically by said display patterns with time information.

27 Claims, 22 Drawing Figures

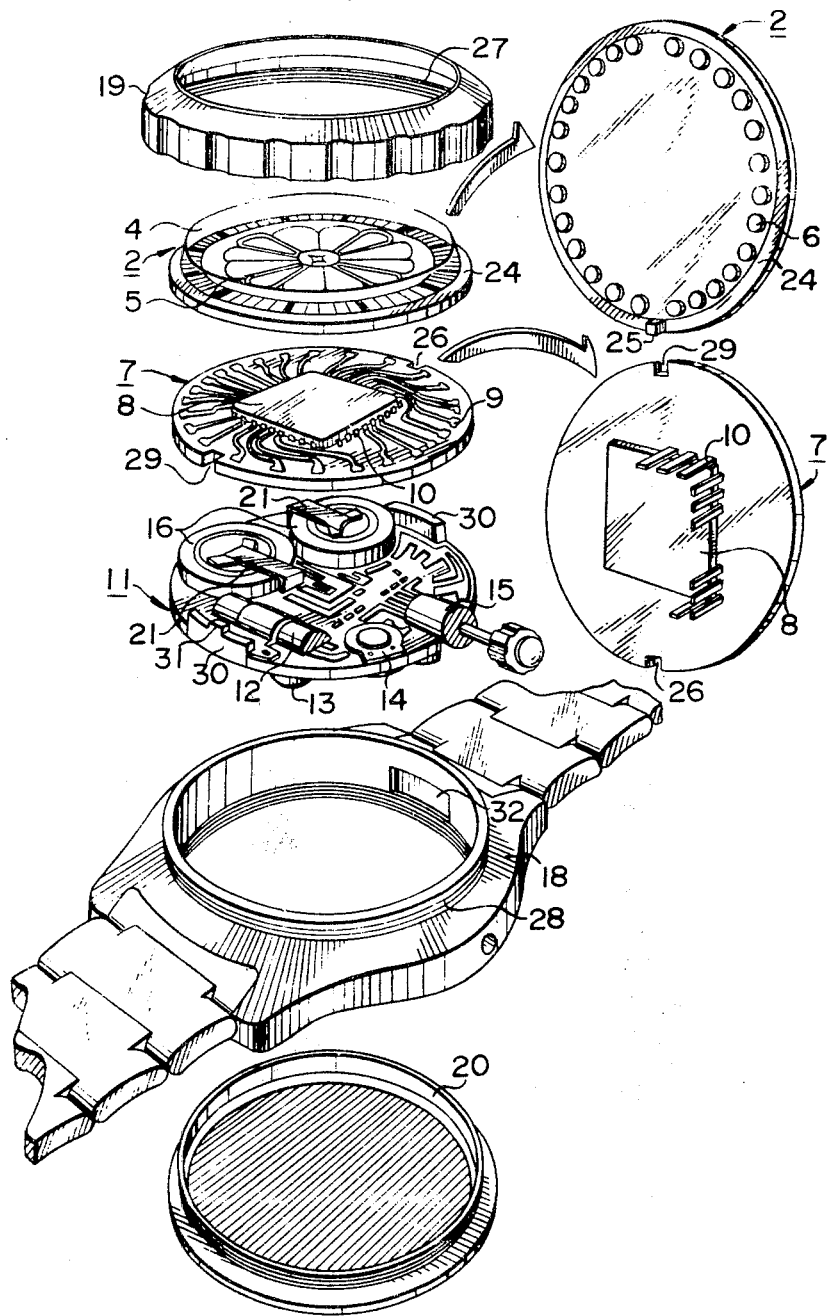

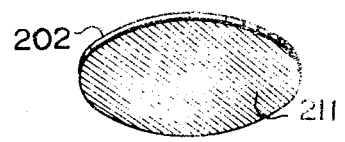
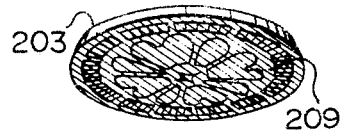
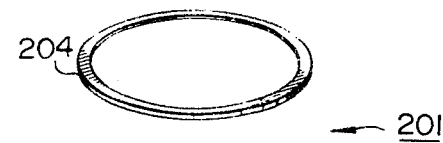
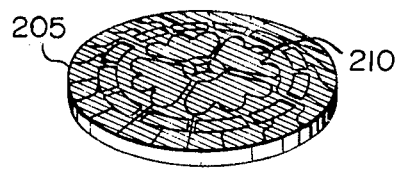
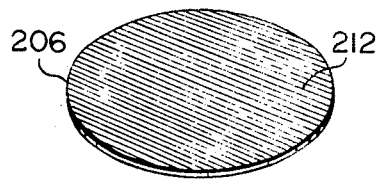
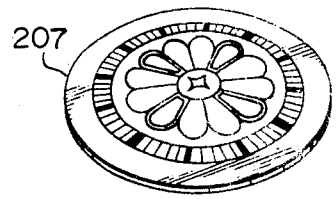
FIG. 4
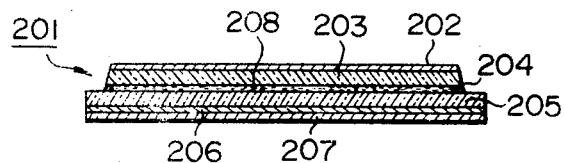
FIG. 5

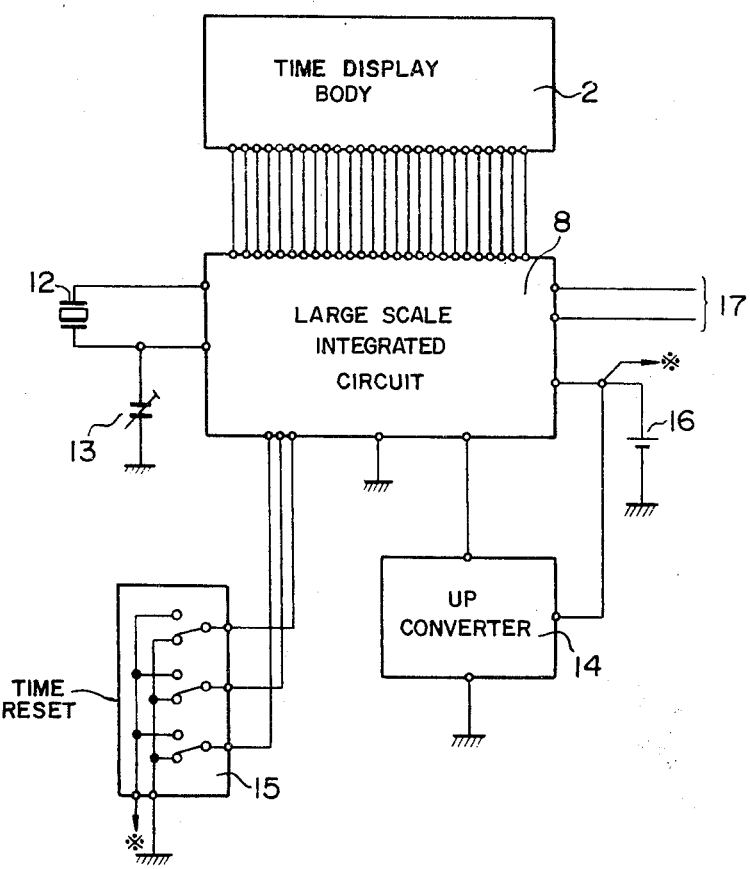
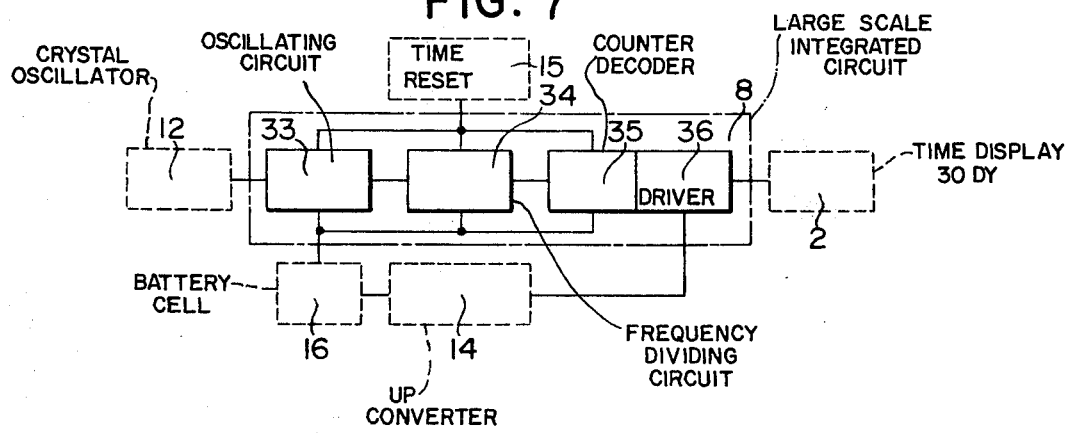

| Contact No. | Electrode | | Contact No. | Electrode | |
|---|---|---|---|---|---|
| | 1 Min. | 5 Min. | | 1 Min. | 5 Min. |
| 1 | $HS_3$ | $HS_3$ | 14 | $MC_6$ | $MC_6$ |
| 2 | $HS_2$ | $HS_2$ | 15 | $HC_2$ | $HC_2$ |
| 3 | $HS_1$ | $HS_1$ | 16 | $MC_5$ | $MC_5$ |
| 4 | SS | $MS_6$ | 17 | $MC_4$ | $MC_4$ |
| 5 | $MC_{12}$ | $MC_{12}$ | 18 | $HC_1$ | $HC_1$ |
| 6 | $MC_{11}$ | $MC_{11}$ | 19 | $MC_3$ | $MC_3$ |
| 7 | $MC_{10}$ | $MC_{10}$ | 20 | $MC_2$ | $MC_2$ |
| 8 | $HC_4$ | $HC_4$ | 21 | $MC_1$ | $MC_1$ |
| 9 | $MC_9$ | $MC_9$ | 22 | $MS_5$ | — |
| 10 | $MC_8$ | $MC_8$ | 23 | $MS_4$ | — |
| 11 | $HC_3$ | $HC_3$ | 24 | $MS_3$ | — |
| 12 | $MC_7$ | $MC_7$ | 25 | $MS_2$ | — |
| 13 | SC | SC | 26 | $MS_1$ | — |

| PIN No. | FUNCTION | PIN No. | FUNCTION |
|---|---|---|---|
| 1 | MS1 (26) | 19 | HC4 (8) |
| 2 | MS2 (25) | 20 | MC10 (7) |
| 3 | MS3 (24) | 21 | MC11 (6) |
| 4 | MS4 (23) | 22 | MC12 (5) |
| 5 | MS5 (22) | 23 | HS1 (4) |
| 6 | MC1 (21) | 24 | SS.MS6 (3) |
| 7 | MC2 (20) | 25 | HS2 (2) |
| 8 | MC3 (19) | 26 | HS3 (1) |
| 9 | HC1 (18) | 27 | |
| 10 | MC4 (17) | 28 | |
| 11 | MC5 (16) | 29 | |
| 12 | HC2 (15) | 30 | |
| 13 | MC6 (14) | 31 | |
| 14 | SC (13) | 32 | |
| 15 | MC7 (12) | 33 | |
| 16 | HC3 (11) | 34 | |
| 17 | MC8 (10) | 35 | |
| 18 | MC9 (9) | 36 | |

FIG. 20
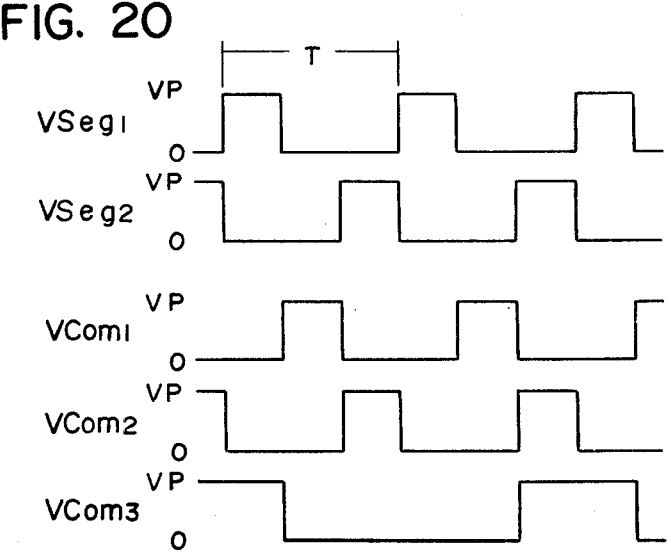
FIG. 21
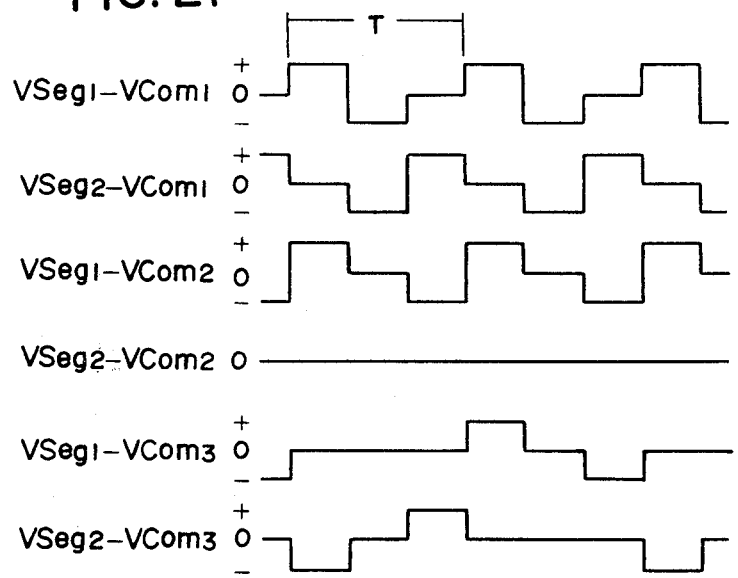
FIG. 22
| Common Segment | Vcom 1 | Vcom 2 | Vcom 3 |
|---|---|---|---|
| V Seg 1 | ON | ON | OFF |
| V Seg 2 | ON | OFF | OFF | s
ELECTRONICALLY CONTROLLED TIMEPIECES USING LIQUID CRYSTAL DISPLAY ELEMENTS

BACKGROUND OF THE INVENTION

This invention relates to an electronically controlled timepiece, and more particularly to an electronic watch utilizing a time indicating body comprising a multitude of liquid crystal display elements.

Recently, several types of clocks and watches utilizing liquid crystal display elements for the time indication have been developed and are attracting attention of consumers. However, most of these types of time display devices are so-called "digital time display" in which the time is represented in the form of numerals. And there has not been existed or put into practical use such an electronically controlled timepiece especially an electronic wrist watch wherein a time display body comprises a multitude of time indicating sections visualized by the electro-optical effect of liquid crystals, and the time is expressed analogically in the form of the various display patterns with time information which appear on the display face of the time indicating body.

On the other hand, there have been many studies on properties of various types of liquid crystal materials lately. Among them, nematic liquid crystals, in particular, are found to work as an effective medium in the application to display devices. It is also well known that there are two types in nematic liquid crystals, that is, the dynamic light scattering mode and the field effect mode. In the liquid crystal with the dynamic scattering mode, turbulence in the molecule alignment is caused when a pertinent electric field is applied across the layer of the liquid crystal confined between a pair of electrode plates. As a result, incident lights are diffused due to this turbulence created within the specific portion of the liquid crystal across which a voltage above the threshold level is applied causing the liquid crystal within this portion to change from clear to "frosted" appearance.

The liquid crystals with the field effect mode can be further classified into two types. One of them has positive dielectric anisotropy within its molecules, and the other has negative dielectric anistropy. When these field effect mode liquid crystals are applied to a liquid crystal display cell which is composed of a pair of Nesa glasses having a plurality of electrodes coated on its opposing surfaces and the liquid crystal confined therebetween, in the case of the liquid crystal with positive dielectric anisotropy, the longitudinal axes of the molecules are so oriented to align in parallel with the plane of the electrodes provided on said pair of glasses, whereas in the case of the liquid crystal with negative dielectric anisotropy, the longitudinal axes of the molecules are perpendicularly aligned to the plane of said electrodes. It is perceivable with the aid of a pair of polarizers that, within these two types of the field effect mode liquid crystals, changes in their molecules alignment are caused in response to application of an electric field. Taking advantage of these characteristics, the nematic liquid crystals of these kinds are widely utilized for various display devices to indicate letters, numerals or figures.

Further, liquid crystals of these types have another advantage of being operable at relatively lower power consumption due to high resistivity close to that of insulators, and the threshold voltage is extremely lower than other electro-luminous substances. Therefore, they have many potentials for application in wide range of measurement devices including portable electronic calculators and horological devices etc. However, there still are a number of problems to be solved in practical application of such a liquid crystal time display device in which a pair of electrode plates constituting an indicating board are equipped with a multitude of sectioned electrodes which constitute unit display elements and the time is indicated by the complicated display patterns created on the display surface with this multitude of display elements.

Still further, in order to drive such a multitude of display elements by conventional driving method, it is necessary to draw out leads from each of these unit electrodes individually and to connect them with corresponding output terminals of the electronic circuits with output systems through respective switching means. As a result, number of such connection leads and switching means will be greatly increased and the distribution works will become very much complicated. Especially, in application of said display elements to such a small size display device as a wrist watch, this defect presents serious problem. Namely, a wide space needed for the distribution of such a large number of leads and a large volume required for the connectors and other components will make it impracticable to house them within the limited space. Further, it tends to cause such troubles as miswiring of the leads or short circuits. In case the part of an electronic circuit having a time output mechanism is constructed with LSI (Large Scale Intergrated Circuit) comprising logic circuit to actuate a multitude of display elements at predetermined cycle, it will involve much difficulty even with the present state of the art technique because the required leads to be brought out from the LSI increase greatly in number, and the package to house the LSI must be expanded only because it is technically difficult to bring out such multitude of leads from the minute LSI. Accordingly, advantage to be anticipated from the employment of the LSI is well offset by such unreasonably large space needed only to accommodate these connection means. Consequently, it has been impracticable with conventional methods to apply the liquid crystal display device as described above to such a compact display device as a wrist watch. Moreover, in order to perform accumulative display by turning ON these multitude of display sections in sequence, there are still more problem to be solved, for example, life of the liquid crystal or contrast between ON sections and OFF sections and other technical problems.

SUMMARY OF THE INVENTION

An object of the present invention is to eliminate the drawbacks inherent in conventional liquid crystal timepieces by technical innovation and to provide a novel and effective electronic timepiece utilizing liquid crystal display elements.

Another object of this invention is to provide the liquid crystal timepiece in which the time is indicated analogically by the display patterns produced on the time indicating face with the multitude of the display elements.

Still another object of this invention is to offer the liquid crystal timepiece in which its time indicating body is adapted to be removed from and attached to the body of the timepiece interchangeably.

Further object of this invention is to supply the liquid crystal timepiece wherein the time display body is to provide the interchangeable construction so that when it is applied against the body of the timepiece, the display body is effectively connected at the respective contacts with the electronic circuits having a time output system thus establishing safe and secure electric contacts between them.

Still further object of this invention is to provide the liquid crystal timepiece in which the contrast in the display patterns between ON states and OFF states of the display elements which appear on the surface of the display body has been improved allowing much easier readout of the time.

Still further object of this invention is to supply the liquid crystal timepiece wherein the display elements for minute indication are turned ON sequentially and keep the ON states accumulatively until a changeover in the hour indication takes place.

Still further object of this invention is to supply the liquid crystal timepiece wherein both display body equipped with display elements sectioned by every one minute and another display body equipped with display elements sectioned in the scale of every five minutes are applicable to the common body of the timepiece interchangeably.

Still further object of this invention is to provide the electronically controlled timepiece using liquid crystal display elements, in which the number of the leads taken out of the liquid crystal display body is greatly reduced in spite of a multitude of the display elements disposed therein, and as a result, the number of the corresponding leads drawn out of the part of the electronic circuits with the output system is effectively reduced enabling the part of the electronic circuits to be constructed by the LSI.

Still further object of this invention is to provide the liquid crystal electronic timepiece in a form of a wrist watch as an embodiment of the objects described above.

BRIEF DESCRIPTION OF THE DRAWINGS

Other objects and advantages of this invention will become apparent upon reading the attached detailed description and upon reference to the drawings in which:

FIG. 2 is a detailed perspective view taken from the liquid crystal watch of FIG. 1.

FIG. 4 is a detailed perspective view of a display body of the watch utilizing the nematic liquid crystal with the field effect mode.

FIG. 5 is a vertical sectional view taken along the center line of the display body in FIG. 4.

FIG. 6 is a schematic diagram showing the lead distribution from an LSI.

FIG. 7 is a block diagram for the whole watch system.

FIG. 20 is a time chart showing another embodiment utilizing other combinations of five kinds of different pulses.

FIG. 21 is a time chart of the combined waveforms which are produced by the combinations of two pulses selected from each group of pulses shown in FIG. 20.

FIG. 22 is a table showing six kinds of ON states and OFF states of the liquid crystal display elements produced by the various combinations of pulses shown in FIG. 18 or FIG. 20.

DETAILED DESCRIPTION OF THE INVENTION

Figure 1:
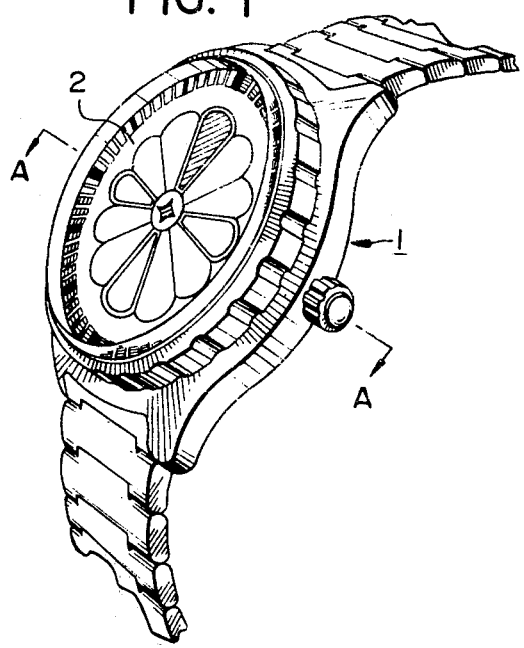
FIG. 1 is an overall perspective view of a liquid crystal watch incorporating features of the present invention.
Figure 3:
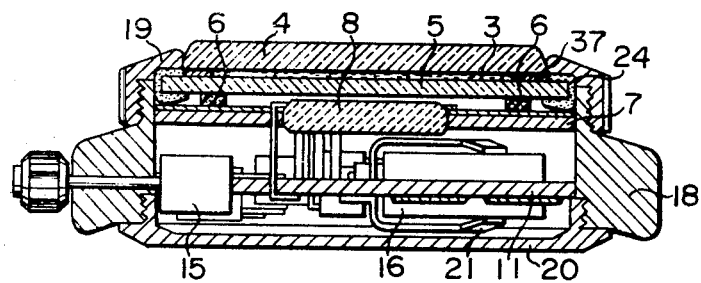
FIG. 3 is a vertical sectional view taken along the center line A—A of the watch in FIG. 1.

Referring now to FIGS. 1, 2 and 3, general construction of an electronically controlled timepiece 1 according to the present invention is described hereinafter. A time indicating body 2 utilizing liquid crystal display elements is composed of a pair of electrode plates, i.e., a front transparent plate 4 and a back transparent plate 5, and the nematic liquid crystal 3 with the dynamic scattering mode confined therebetween with the aid of a spacer 37 of insulating material. On each side of the opposing surfaces of the plates are provided a plurality of electrodes arranged in the predetermined order of activation, which are formed by coating with conductive materials such as tin-oxide (Nesa films). These electrodes are respectively positioned and shaped to correspond to the display pattern for hour and minute indications. This display body 2 shown in FIG. 1 through FIG. 3 is one embodiment utilizing the liquid crystal of dynamic scattering mode. In the case where it is intended to use the liquid crystal of field effect mode, and more particularly, the liquid crystal with positive dielectric anisotropy, another type of a time indicating body 201 as illustrated in FIG. 4 and FIG. 5 must be utilized. This type of the display body 201 is provided with the construction as described hereunder. As shown in FIG. 4, a plurality of hour and minute display sections having various shapes respectively are formed on the opposing surfaces of a pair of transparent electrode plates 203 and 205 by coating with conductive materials such as tin-oxide so as to act as electrodes. Between said pair of plates, the field effect mode liquid crystal 208 with positive dielectric anisotropy is sandwiched with the aid of a spacer 204. One surface of the plate 203 which comes in contact with the layer of the liquid crystal 208 is processed beforehand by rubbing in one direction 209 with cotton cloth or the like, while one surface of the plate 205 which comes in contact with the layer of the liquid crystal 208 is so processed that its direction 210 of the rubbing crosses with that of the plate 203 at right angles when these two plates are opposed each other. Under this condition, within said nematic liquid crystal 208, the longitudinal axes of the molecules are aligned in each direction along that of the rubbing on both sides of the opposing surfaces of the plates 203 and 205 which respectively come in touch with the layer of the liquid crystal, thus representing, so-called, "twisted nematic structure". A liquid crystal display cell 201 thus fabricated has an effect that the plane of polarization of the incident light is gradually twisted round as it passes through the liquid crystal layer. A pair of polarizing plates 202 and 206 sandwiching the above liquid crystal display cell are placed so that their respective planes of polarization are intersected at right angles to each other. Moreover, these polarizing plates are positioned so that their polarizing axes 211 and 212 become parallel with the respective directions of the rubbing 209 and 210 of the plates 203 and 205 respectively. In addition, a reflecting plate 207 is placed behind the polarizing plate 206. It is made of material such as white paper and has various display patterns printed thereon which correspond with respective hour, minute and second display sections as described hereinbefore. This reflecting plate 207 is preferably made of material in white color which makes total reflection. The display pattern for time information may be printed either in black or in other colors on the white background of said reflecting plate 207. This display pattern thus printed on the reflecting plate must correspond to the resultant electrode patterns which are formed by coating on the both sides of the opposing surfaces of a pair of plates 203 and 205.

When no electric field is applied across said electrodes pairs, the incident light through the front surface of the display body is polarized thereon by the medium of the plane of polarization of the polarizing plate 202. As the ray goes through the display cell, the plane of polarization of the light rotates by the angle of 90°. Therefore, it is transmitted through the polarizing plate 206 and reaches the reflecting board 207. As a result, the display pattern printed on the reflecting board 207 can be viewed through the display cell. When a desired electric field is applied across the layer of the liquid crystal at a required portion between said electrodes pairs, in this portion of the layer of the liquid crystal which comes in contact with the electrodes pairs which a pertinent voltage is applied therebetween, the longitudinal axes of the molecules are caused to align perpendicularly to the plane of said electrodes. As a result, said portion of the liquid crystal loses the effect of rotating the plane of polarization of the incident light. Accordingly, the light polarized by the polarizing plate 202 goes right on through the liquid crystal layer, but is blocked by the polarizing plate 206 and cannot reach the reflecting board 207 because the plane of polarization of the plate 206 is perpendicularly intersected with that of the incident light. Taking advantage of this effect, the desired display sections to represent the time information at that time emerge in striking contrast to the rest of the display sections as the light is not reflected at that portion.

As another embodiment, the pair of polarizing plate 202 and 206 may be arranged so that their respective planes of polarization align in parallel with each other. In this arrangement, in absence of an electric field across said electrodes pairs, a uniformly dark surface is observed on the display face as there is no light reflected from the reflecting plate 207. In response to the application of the electric field, only the incident light at the portion goes through the liquid crystal display cell and is reflected by the reflecting plate 207, so that the display pattern printed thereon can be observed. In this manner, a very high contrast ratio in the time display pattern can be obtained by the combination of the field effect nematic liquid crystal and a pair of polarizing plates allowing easy readout of the time indication.

As still another embodiment, the display body may be improved so that the display face represents the time information in desired colors, if one of the polarizing plates is substituted by a dichromatic polarizing plate, which comprises a pair of polarizing plates sandwiching a transparent material such as a plastic film so that their polarizing axes are perpendicularly crossed. For example, if it is desired that the time display is represented in red color on a white background in the display pattern, one of the polarizing plates, e.g. the polarizing plate 206, may be substituted with dichromatic polarizing plate, one surface of which, i.e. opposite to the reflecting plate 207 being dyed red. Further, if it is desired the display with the background in another color, e.g. in blue color, the face of the polarizing plate 206 opposite to the electrode plate 205 adjacent to said plate 206 may be dyed blue. Thus the red time information is represented on a blue background. Various combinations may be considered between the colors for the time information and those for the background.

An observer of the liquid crystal display watch 1 as shown in FIG. 1 will be able to recognize the time at a glance at the display pattern appearing on the display face. This is fundamentaly different from either those of conventional watches indicating the time by regular hands or some time indicating marks, or digital display timepieces by numerical information. For hour information, a particular display section provided on the display face corresponding to the particular hour of the day is turned ON for the duration of an entire hour. In the case of a display body using the liquid crystal of dynamic scattering mode, the liquid crystal within said display section scatters light presenting an optical effect while rest of the sections are kept in OFF state, that is, the liquid crystal therein remains clear, and the hour is recognized by identifying this frosted effect in the hour display section. When 1 hour has passed, the succeeding hour display section is turned ON and the preceding hour display section which so far has been in the ON state is turned OFF, thus indicating the hour. In the case of a display body using the liquid crystal of field effect mode, the hour is indicated by the display patterns produced by either non-existence of the reflecting light or existence of the reflecting light on particular hour display section corresponding to the hour of the day as detailed hereinabove. For minute information, starting from the initial minute display section representing either 1 minute or 5 minutes, particular minute display section corresponding to the minute at that time is turned ON successively as time lapses. However, contrary to the display in the hour display section, with lapse of every 1 minute or 5 minutes, the minute display sections thus turned ON increase in number one by one keeping the sections which have already been turned ON in the ON state and the succeeding minute display sections are added to this ON state, thus maintaining accumulative display in minute display sections until a changeover in the hour display section takes place. The minute of the time can be easily recognized either by counting the number of the minute display sections which have already been brought into ON state, or by confirming the end position of thus accumulatively turned ON minute display sections. Further, for the purpose of allowing easier and quicker readout of the time, improvement may be made by providing some key points such as thicker boundaries in several places. According to the display technique described above, the liquid crystal watch 1 in FIG. 1 indicates 12:43.

Now, description will be given as to the layout of the electrodes, on which a display pattern to be produced on the time display body 2 is based. At first, for the convenience of explanation, let the desired numbers of the hour and the minute display sections be K for hour indication and L for minute indication respectively. These numbers K and L are respectively solved into two factors, i.e., $K = K1 \times K2$ and $L = L1 \times L2$. In this case, it will be desirable that the respective sums of the each two factors, i.e., $K1 + K2$ and $L1 + L2$ are as small as possible. One of the pair of electrode plates composing the display cell is equipped in predetermined positions on one surface thereof with K pieces of electrodes for the hour display which are divided into K1 blocks so that each block contains K2 pieces of electrodes, and with L pieces of electrodes for the minute display which are divided into L1 blocks so that each block contains L2 pieces of electrodes. These K and L pieces of electrodes act respectively as segment electrodes. The other electrode plate is equipped in predetermined positions with K1 pieces of electrodes for the hour display which are respectively sized and shaped to correspond to the hour blocks, and with L1 pieces of electrodes for the minute display which are also sized and shaped respectively to correspond to the minute blocks. These K1 and L1 pieces of electrodes act respectively as common electrodes. When these two plates thus processed are faced each other, a desired display pattern is produced with each hour and minute indicating sections being arranged in predetermined order and positions. From each segment electrode in respective initial blocks for the hour and the minute display on the former plate, a lead is brought out and it meanders through all relative blocks to interconnect associated electrodes in subsequent blocks. In this method, number of the total leads required for the former plate will be $K2 + L2$. On the latter plate, a lead is brought out from every common electrode for the hour and the minute display provided thereon; then the total number of leads required for the latter plate will be $K1 + L1$. Therefore, the sum of $K1 + K2 + L1 + L2$ will be suffice for the total number of leads needed for the interconnection to the output terminals of the driving device for the liquid crystal. In order to drive liquid crystal display elements in the display body, desired numbers of transparent segment electrodes are provided by coating on one surface of the former transparent electrode plate and desired numbers of transparent common electrodes are provided by coating on the opposing surface of the latter transparent electrode plate opposite to said former electrode plate, and then the layer of the liquid crystal is sandwiched between said pair of electrode plates, so that a multitude of the liquid crystal display elements are formed constituting the particular display sections respectively. When a voltage above the threshold voltage within the response region of liquid crystals is applied across a layer of the liquid crystal between a pair of segment and common electrodes at certain display section, the display element at that display section is activated to be turned ON representing particular display information, that is, the hour and the minute at that time.

As one embodiment of the timepiece in this invention, assume that the time indicating body 2 is equipped with 60 display sections for minute indication and 12 display sections for hour indication. According to conventional method, it has been necessary to arrange 60 leads for 60 segment electrodes and one extra lead for one common electrode for minute display, while 12 leads for 12 segment electrodes and one extra lead for one common electrode for hour display have been required. Therefore, the total number of leads required will be as many as 74. In contrast, in the time display body constructed according to the present invention, the total numbers of leads required can be reduced to 24. At first, the number 60 for 60 display sections for minute indication is solved into two factors in the manner that the sum of the factors be as small as possible. Therefore, in this case, the number 60 is solved into 5 and 12, which, at the same time, is most convenient for time indication. Accordingly, 60 segment electrodes are disposed so as to form 12 blocks each having five segment electrodes on one of the electrode plate. On the other electrode plate, 12 common electrodes are disposed so that each of them is shaped and positioned to correspond to each block of the segment electrodes. Meanwhile, the number 12 for 12 display sections for hour indication is solved into two factors, namely 3 and 4. Then 12 segment electrodes divided into four blocks by three segment electrodes per block are disposed on the former plate. And the latter plate is disposed with four common electrodes which are respectively shaped and positioned to correspond to each block of the segment electrodes.

Figure 9:
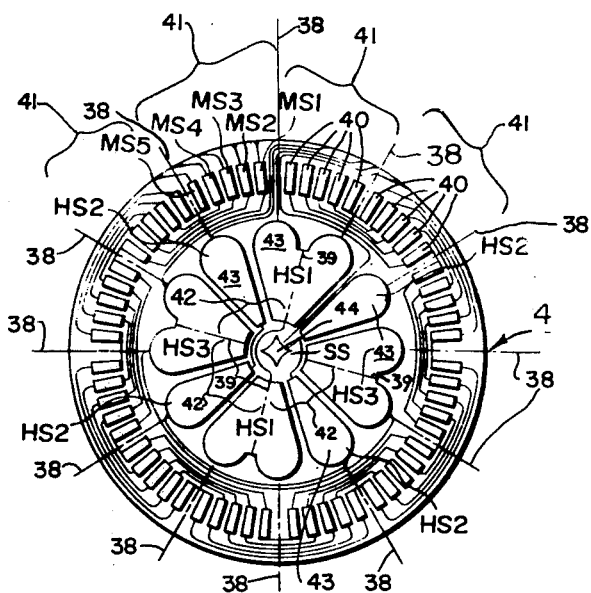
FIG. 9 illustrates a layout of segment electrodes arranged on the front electrode plate equipped with 60 unit electrodes representing every one minute information.

Referring now to FIG. 9, interconnection of each segment electrode on the front plate 4 is described hereinafter. In minute indication, it will be noticed that each lead is meandering through all blocks so as to interconnect 12 segment electrodes one after another which are symmetrically positioned with respect to each block boundary 38 between the adjacent blocks 41, starting from each segment electrode 40, in the initial block. As can be seen in the figures, no leads cross each other. Therefore, only five leads are sufficient for the minute display. For hour indication, each lead is also meandering through all blocks 42 so as to interconnect four segment electrodes 43 one after another which are symmetrically positioned with respect to each block boundary 39 in like manner. Therefore, only three leads are enough for the hour display. Then the total number of leads required in the front plate 4 will be equal to the numbers of the segment electrodes 40, 43 contained within each block 41, 42 for hour and minute information. Therefore, the total number of the leads will be only eight in this embodiment. With respect to the back plate 5, a lead is brought out from every common electrode MC 1–MC 12, HC 1–HC 4. Therefore, the number of the leads required will be equal to the total number of the common electrodes MC 1–MC 12, HC 1–HC 4. In this embodiment, it will be 16, i.e., the sum of 12 common electrodes for minute display and four common electrodes for hour display. Thus the aggregate total of necessary leads becomes 24; 8 + 16 = 24. As seen in above description, the present invention greatly reduces the number of leads from 74 required in the conventional method to only 24, which is the sum of above four factors; 5, 12, 3 and 4. Thus one of the object of the invention is fulfilled.

The leads thus brought out from said two electrode plates 4, 5 which confine the layer of the liquid crystal with the aid of the insulated spacer 37 are adapted to go through the holes perforated at the predetermined locations on the circumferential portion of the back plate 5, that is the latter plate, or make detours along the conductive paths provided on the peripheral edge of the back plate 5, then reaching the back face of the back plate 5. Then the leads are respectively connected with corresponding conductive rubber contacts 6 which are to be provided on the back face of the time indicating body 2. Said conductive rubber contacts 6 serve as input terminals for the display body. It is necessary to provide as many such conductive rubber contacts as the total number of leads. These conductive rubber contacts 6 may be provided either directly on the back face of the back plate 5 or may be provided indirectly on a contact base which is adapted to cover the back face of the back plate 5. Thus the time display body 2 is constructed as an exchangeable component, in which it can be removed easily from the rest of the display device through the medium of the conductive rubber contacts 6. An upper printed circuit board 7 attached beneath the back face of the time display body 2 is provided with an electronic circuit, that is, an LSI 8 incorporating time output system, from which a plurality of leads 9 are radially brought out on the upper circuit board 7 so as to connect to the corresponding conductive rubber contacts 6 respectively. Pulse signals generated in the LSI 8 are delivered to the respective display elements in the time display body 2 through the leads 9 and the contacts 6.

A plurality of leads 10 extending downward from the LSI 8 provided on the upper circuit board 7 are respectively connected to a crystal oscillator 12 to generate a base oscillations at a fixed high frequency, a trimmer condenser 13 to adjust the base frequency sent from the crystal oscillator 12, and up-converter 14 to increase voltage so as to actuate the liquid crystal display elements, a time reset means 15 to adjust the hour, minute and second, and battery cells 16 to supply power source, all of which are placed on a lower printed circuit board 11. The upper board 7 and the lower board 11 are combined into a unit.

Now, refer to FIG. 6 showing lead distribution from the LSI incorporated in the present liquid crystal watch and to FIG. 7 showing a block diagram. Two leads are associated with the crystal oscillator 12, one of which branches off to connect with the trimmer condenser 13. Other three leads are respectively for the battery cell 16, for the up-converter 14 and for ground. The remaining three leads are connected with the time reset means 15. Then the total of leads drawn out to the lower board 11 from the LSI amounts to 10 with additional two leads 17 intended for date indication. From the time display body 2 comprising the front plate 4 and the back plate 5 which are respectively equipped with segment and common electrodes as set forth hereinbefore, 17 leads for minute information and seven leads for hour information are brought out with additional two leads intended for second information. Therefore, the total number of leads becomes 26, and they are respectively associated with the corresponding 26 leads brought out from the LSI 8. Consequently, the leads brought out from the LSI 8 will aggregate to 36.

As detailed hereinbefore, the total number of leads brought out from the LSI can be greatly reduced as compared with the conventional method, which will ease technical difficulties involved in manufacturing LSIs. Further, this reduction in the number of leads will permit not only to draw out leads more easily from a receptacle housing a very small LSI, but to minimize the size of the receptacle enabling the device to be applied to a wrist watch.

The time display body 2 is removably engaged with the upper board 7 fixed on the lower board 11, thus constructing a principal part of a watch. This principal part is inserted into a case 18. A cover ring 19 to hold the time display body 2 and a bottom cover 20 are engaged respectively with the case 18 at the upper and lower threaded portions of the case to complete the liquid crystal watch 1 of the present invention.

The battery cells 16 held by battery holders 21 are removably set on the lower board 11. When the battery cells have worn out, the bottom cover 20 is unscrewed to be detached from the lower board 11, then the exhausted battery cells are removed from the battery holders 21 for exchange for new ones. The lower board 11, when provided with new battery cells, are again attached to the bottom cover 20. Thus enough power source can be always secured.

The conductive rubber contacts 6 disposed on the back face of the time display body 2 are formed by processing a mixture of non-conductive rubber material such as silicon rubber and a conductive material such as carbon or silver. In practical application, it will be convenient to engage a contact base which is made of a non-conductive rubber film to the back face of the time display body so that the conductive rubber contacts 6 are inserted and fixed therein. The annular flange portion 22 around the back plate 5 is covered with a ring insulator 24 made of rubber, which not only protects the leads forming current paths but serves as a portion to be pressed by the cover ring 19 supporting the time display body. The ring insulator 24 is also used to insure a watertight closure between the indicating body 2 and the case 18. A projection 25 provided on the back face of the time display body is engaged with a recess 26 made on the circumferential edge of the upper board 7. Such engagement prevents the time display body from rotating. Then the cover ring 19 is pressed against the time display body and screwed so that a threaded portion 27 threaded on the inside of the cover ring 19 and a threaded portion 28 provided on the outside of the case 18 are interengaged. Thus the time display body 2 is fixed. When the time display body so constructed as an exchangeable component as set forth hereinbefore is attached to watch, the projection 25 fixed on the back face of the time display body is adapted to be engaged with the recess 26 made on the upper board 7. Then the 26 conductive rubber contacts 6 are effectively connected with the corresponding leads 9 brought out from the LSI 8, respectively. Another recess 29 positioned on the opposite side to the recess 26 on the upper board 7 is engaged with a projection 31 projecting from one of the two lobes 30 prepared on the circumference of the lower board 11. Then, 10 leads extending downward from the LSI 8 placed on the upper board are respectively associated with appropriate current paths etched on the lower board. Thus the upper board 7 and the lower board 11 are assembled into a unit. The LSI 8 on the upper board and all the components on the lower board are electrically connected respectively. When this unit comprising the upper board 7 and the lower board 11 is set in the case 18, two lobes 30 which are oppositely positioned on the circumference of the lower board 11 are engaged respectively into two slots 32 which are oppositely positioned on the inner side of the case 18. Thus a base component of the timepiece to receive the time display body 2 is composed.

Figure 8:
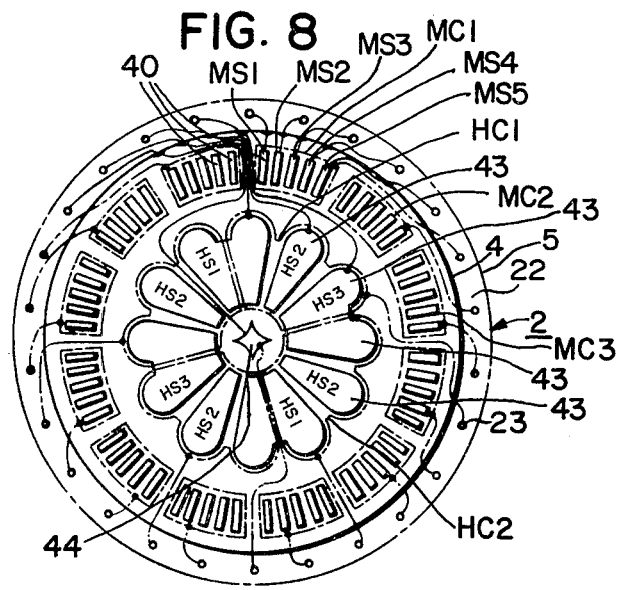
FIG. 8 illustrates a layout of the electrode pattern in a time display body having sixty display elements for 1 minute indication, which is viewed through the front surface to the opposed electrode plates.
Figure 11:
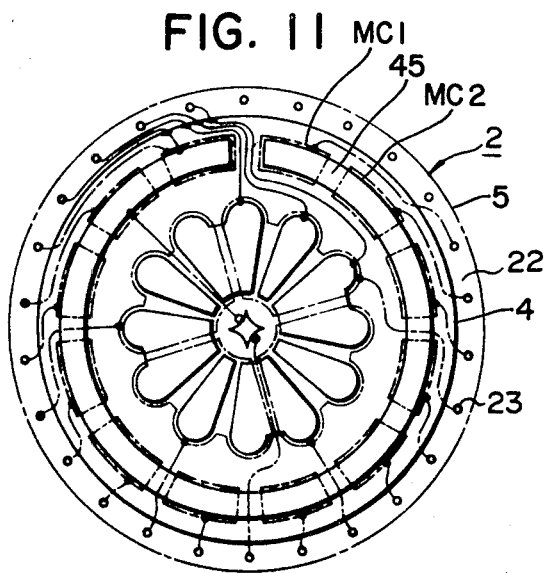
FIG. 11 shows a layout of the electrode pattern in a time display body having 12 display elements for 5 minutes indication, which is viewed through the front surface to the interfaced electrode plates.
Figure 10:
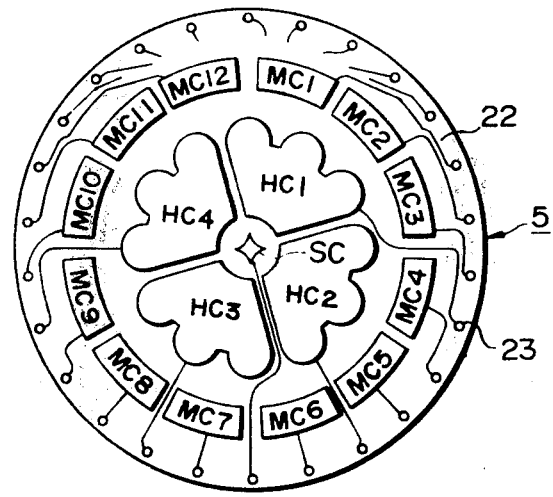
FIG. 10 illustrates a layout of common electrodes arranged on the back electrode plate equipped with 12 unit electrodes representing every 1 minute information and to be interfaced with the front electrode plate of FIG. 9.

The detailed construction of the time indicating body 2 for the electronic watch 1 of the present invention is described hereinafter with two embodiments. One of them represents minute information every 1 minute, and the other represents every 5 minutes. Either time display may be applied to the same watch interchangeably to make a successful time indication. The time display body 2 presenting every 1 minute information shown in FIg. 8 comprises a pair of plates, one of which is the front plate 4 arranged with a pattern of electrodes shown in FIG. 9, and the other of which is the back plate 5 arranged with a pattern of electrodes shown in FIG. 10. The two plates are concentrically placed so that they face each other at every correspsonding electrode. The diameter of the back plate 5 is a little greater than that of the front plate 4, leaving a flange portion 22 around the circumference of the back plate 5. FIG. 8 is a plan view looked through the time display body 2 of above construction from the front plate side. The time display body 2 representing every five minutes information shown in FIG. 11 likewise comprises a front plate 4 shown in FIG. 12 concentrically placed on a back plate 5 shown in FIG. 13. In FIG. 11, the time display body 2 is looked through from the front plate side. The front plate 4 is made of transparent $SnO_2$ coated glass and the back plate 5 is made of similar $SnO_2$ coated glass. The back plate 5 may be treated by evaporating reflective material such as aluminum when it is intended to serve as a reflecting plate. On the annular flange portion 22 around the back plate 5, 23 holes are bored at equal distance and said holes are respectively corresponding to the conductive rubber contacts 6 provided on the back face of the time display body 2. In FIG. 9, 60 rectangular sections (segment electrodes 40) are divided into 12 blocks 41, each block 41 including five sections 40 each presenting minute information every 1 minute, which are radially arranged by coating conductive material on the circumferential portion of the front plate 4. The sections act as segment electrodes 40. From the five indicated segment electrodes MS1, MS2, MS3, MS4, MS5 within the initial block 41, five leads forming current paths are brought out to the five predetermined holes 23 bored on the annular flange portion around the back plate 5 as illustrated in FIG. 8. Every lead as stated above is meandering as shown without crossing each other through all the blocks 41 connecting 12 segment electrodes 40 one after another which are symmetrically positioned with respect to each block 41 boundary 38, starting from the initial block. In the same manner, 12 petal-shaped sections 43 for hour information formed by coating conductive material are divided into four blocks 42 by three sections per block and disposed on the inner portion of the front plate 4. They also act as segment electrodes 43 as shown in FIG. 9. From the three indicated segment electrode sets, HS1, HS2, HS3 within the initial block 42, three leads are brought out to the three predetermined holes 23 on the annular flange portion of the back plate 5 as illustrated in FIG. 8. The three leads are respectively meandering and connecting appropriate segment electrodes 43 in the same manner as in the case of the minute information. Lastly, a lozenge-shaped section 44 positioned at the center of the front plate 4 acts as a segment electrode SS for second information, from which a lead is brought out to the predetermined hole 23 bored on the annular flange portion of the back plate 5 as illustrated in FIG. 8. In FIG. 10, 12 sections, each of which is made to correspond to the size and shape of each block for the minute information, are provided by coating in the corresponding positions of the back plate 5. They act as common electrodes for minute information, MC1, MC2, MC3 . . . MC11, MC12, from which the leads are respectively brought out to the 12 predetermined holes 23 bored on the annular flange portion of the back plate 5. For hour information, four common electrodes, HC1, HC2, HC3, HC4, of the same size and shape as the block 42 of the segment electrodes 43 for hour information are also provided in the appropriate positions of the same back plate 5. Four leads are brought out respectively from four common electrodes to the four predetermined holes 23 on the annular flange portion of the back plate 5. A lozenge-shaped section 44 at the center of the back plate 5 is a common electrode SC for second information of the same size and shape as the segment electrode SS and positioned to correspond to the segment electrode SS. From the common electrode SC, a lead is brought out as illustrated to the predetermined hole 23 on the annular flange portion of the back plate 5.

When the front plate 4 and the back plate 5 provided with segment and common electrodes 40, 43, 44, MC 1–MC12, HC 1–HC 4 for hour, minute and second information in order of turning ON as shown in FIG. 9 and FIG. 10 are placed so that they are facing each other, an electrode pattern apears as shown in FIG. 8. Based on this electrode pattern, a display pattern as shown in FIG. 1 comes out, wherein each display section for hour and minute information appears to be radially and separately disposed in order of turning ON respectively. However, when liquid crystal material is confined between above two plates in just microns of thickness with the aid of a spacer, such a pattern of electrodes and leads as stated above all disappears and only the sections then turned ON are clearly exhibited, thus indicating the time.

Figure 12:
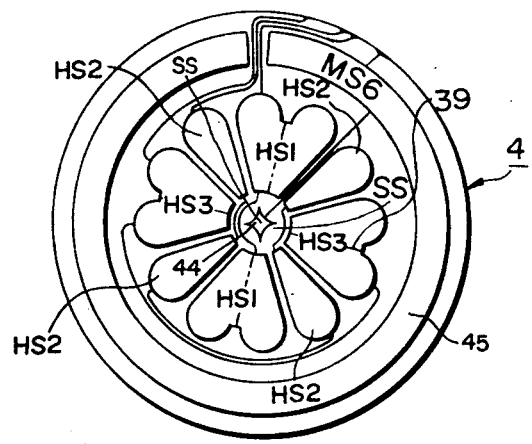
FIG. 12 shows a layout of segment electrodes arranged on the front electrode plate equipped with one segment electrode adapted for the time indication in 5 minutes intervals.
Figure 13:
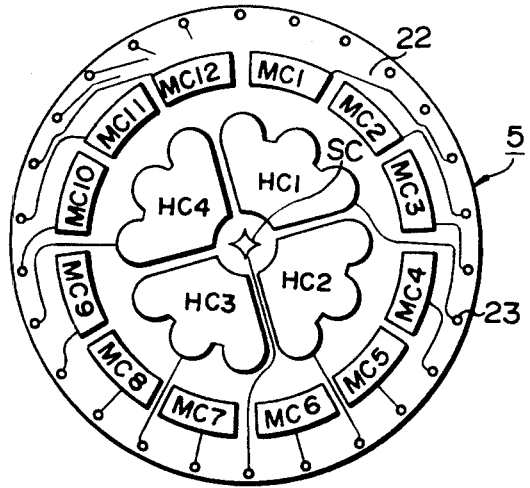
FIG. 13 shows a layout of common electrodes arranged on the back electrode plate equipped with 12 unit electrodes each representing 5 minutes periods, and to be opposed with the front electrode plate of FIG. 12.

The time display body presenting every five minutes information shown in FIG. 11 is constructed in like manner as above. A front plate 4 and a back plate 5 are respectively provided with a segment electrode 45 and common electrode MC 1–MC 12 for our information and a segment electrode 44 for second information which are respectively designed in accordance with a desired display pattern. From the two plates, required number of leads are drawn out to the corresponding holes 23 on the annular flange portion of the back plate 5. However, the time display presenting every 5 minutes information differs from the time display presenting every 1 minute information in the point that the segment electrode MS6 disposed on the front plate 4 is shaped into one annular electrode 45 as illustrated in FIG. 12, and only one lead is brought out therefrom. A lead from the segment electrode SS (44) is also connected with the segment electrode MS6.

Figures 14, 15:
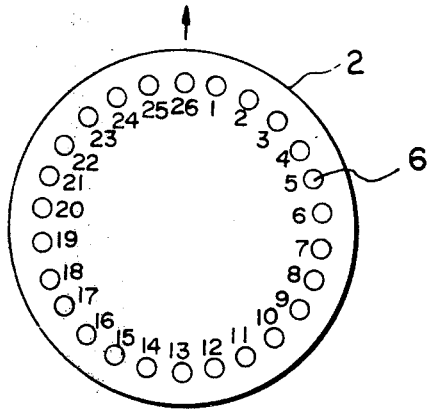
FIG. 14 shows correlation in the locations of a plurality of contacts provided on the back side of the display body.
FIG. 15 is a table explaining electrical connections between the plurality of contacts shown in FIG. 14 and corresponding unit electrodes.
Figures 16, 17:
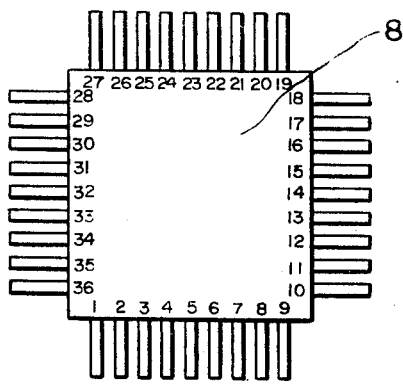
FIG. 16 shows correlation in the locations of a plurality of output terminals brought out of the LSI.
FIG. 17 is a table explaining the correlation about electrical connections between the contacts in FIG. 14, the unit electrodes in FIG. 15 and the output terminals in FIG. 16.

As detailed hereinbefore, the time display body 2 having a freely designed display pattern is provided with 26 leads for every 1 minute information or 21 leads for every 5 minutes information, which are respectively brought out from the front plate 4 and the back plate 5. These leads go through the holes 23 bored at equal distance on the flange portion 22 around the back plate, and then connect with appropriate conductive rubber contacts 6 formed on the back face of the time display body. FIG. 14 illustrates the back face of the time display body 2 and each contact therein is numbered as shown. FIG. 15 will explain electrical connection between the contacts and the electrodes in both of the time display bodies representing every 1 and 5 minutes informations. FIG. 16 illustrates 36 leads brought out from the LSI 8, including 26 leads to the time display body and 10 leads to the lower board, each of which is numbered from 1 to 36. FIG. 17 explains electrical connection between the leads and the electrodes. The numbers within parenthesis indicate the contact numbers. In FIG. 17, 10 leads from 27 to 36 are omitted, because they can be connected alternatively with any component disposed on the lower board.

If the time display body is so constructed that the segment and common electrodes provided on the pair of plates are associated one by one with appropriate contacts on the back face of the time display body as set forth hereinbefore, desired pulse signals can be delivered from the LSI 8 engaged in the upper board 7 via relative contacts, thus permitting the liquid crystal display elements to be turned ON or OFF as desired on the display face. Therefore, only if each electrode disposed on the pair of plates so as to make a desired display on the display face is properly connected with a relative contact on the back face of the time display body, any desired pattern can be exhibited on the time display body. Consequently, various kinds of time display bodies with different display patterns may be produced. Moreover, both types of the time display bodies presenting every 1 minute information in FIG. 6 and every 5 minutes information in FIG. 7 may be used in the same watch interchangeably without any trouble.

As power source, two silver oxide battery cells 16 of about 1.5V are used in these embodiments, and they are supported by the battery holders 21 provided on the lower board 11, and can be easily replaced. The oscillating circuit 33, the frequency dividing circuit 34 and the counter-decoder 35 are driven by 1.5V power supplied by the battery cells 16. The driver 36 requires a DC voltage of 6 to 8V to actuate the liquid crystal elements to be turned ON or OFF. Therefore, the voltage must be increased by the up-converter 14 so as to meet the requirement.

Figure 18:
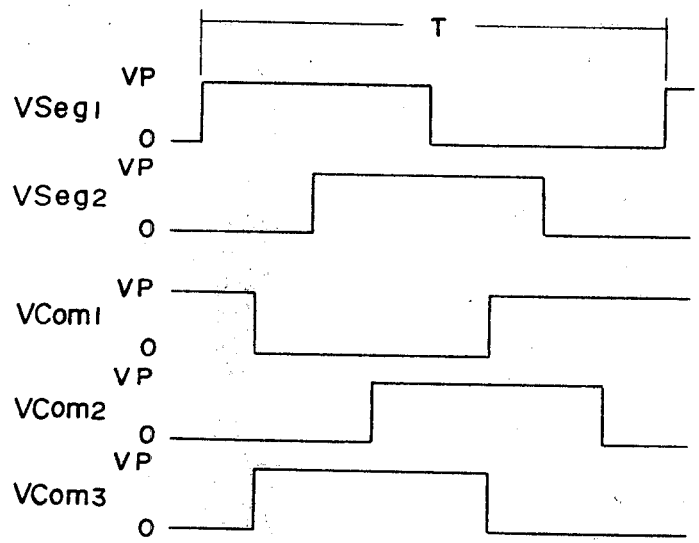
FIG. 18 is a time chart illustrating five kinds of pulses for driving liquid crystal display elements.
Figure 19:
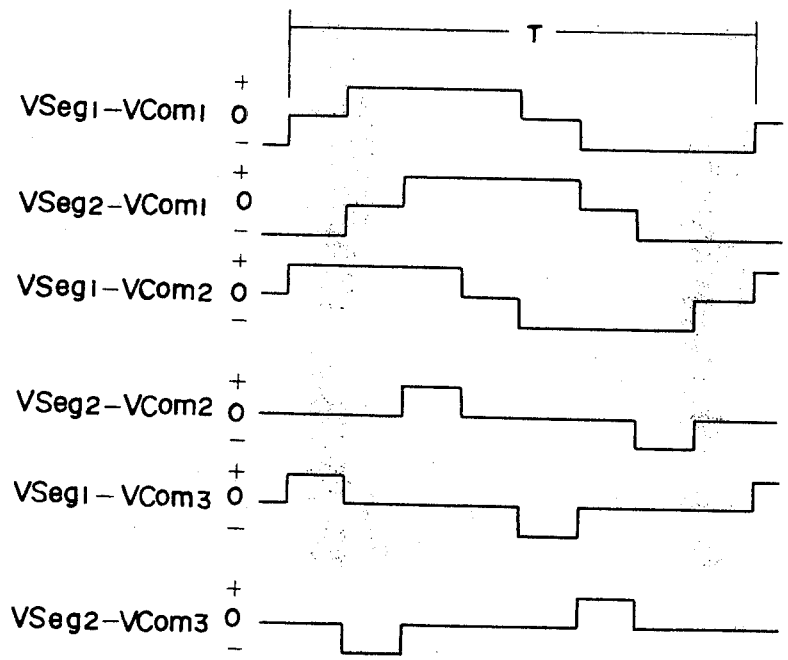
FIG. 19 is a time chart illustrating the combined waveforms which are produced by combining two pulses selected from each group of pulses shown in FIG. 18.

Now, detailed description will be given relating to a method for actuating the liquid crystal watch 1 of the present invention. A crystal oscillator 12 prepared on the lower board 11 and an oscillating circuit 33 incorporated in the LSI 8 are combined to generate a base pulse of high frequency, which is adjusted by a trimmer condenser 13 to 32.768 KHz. The high frequency pulse is counted down to become two time output pulses of 1 pulse per second and of 1 pulse per minute in a frequency dividing circuit 34, and simultaneously it is modulated into the five kinds of pulse signals for driving the liquid crystal display elements, VSeg1, VSeg 2, VCom 1, VCom 2, VCom 3, as shown in FIG. 18 or FIG. 20. The output pulses of 1 pulse per minute is further counted down by a counter decoder 35 to a time output pulse of 1 pulse per hour. The outputs of the counter are decoded so as to produce a plurality of control pulses to control said pulse signals for the driving the display elements in the counter-decoder 35. Two of the pulse signals, VSeg 1, VSeg 2, are applied to the segment electrodes, and the other three pulse signals, VCom 1, Vcom 2, VCom 3, are applied to the common electrodes. These output pulse signals are in the form of direct current pulses each cycling at T period. One of three kinds of these pulse signals VCom 1, VCom 2 and VCom 3 are associated respectively with one of two kinds of these pulse signals VSeg 1 and VSeg 2 in the manner of six kinds of combinations of two selected pulses, and these combinations of two pulses produce six kinds of potential differences between common and segment electrodes as shown in FIG. 19 or FIG. 21. In the case of FIG. 18, six kinds of resultant waveforms, that is, the combination of the pulse signals VSeg 1 and VCom 1, the combination of the pulse signals VSeg 2 and VCom 1 and the combination of the pulse signals VSeg 1 and VCom 2 create the effective value of the voltage at a rate of three-fourth of the VP (VP means the peak value of a voltage) which is above the threshold voltage for the liquid crystal, and the combination of the pulse signals VSeg 2 and VCom 2, the combination of the pulse signals VSeg 1 and VCom 3 and the combination of the pulse signals VSeg 2 and VCom 3 create the effective value of the voltage at a rate of one-fourth of the VP which is below threshold voltage for the liquid crystal. In the case of FIG. 20, three kinds of the combined waveforms which are produced by the combinations of two pulses, for this example, VSeg 1 and VCom 1, VSeg 2 and VCom 1, VSeg 1 and VCom 2 comprise the effective value of the voltage at a rate to two-third of the VP to be applied in the alternating field between electrode pairs. The effective value of the voltage acquired by the waveform to be formed by the combination of the pulse signals VSeg 2 and VCom 2 becomes 0 volt to turn OFF display elements. Further, two kinds of the combined waveforms which are produced by the combination of two pulses, that is, VSeg 1 and VCom 3, VSeg 2 and VCom 3 comprise the effective value of the voltage at a rate of one-third of the VP to be applied in the alternating field between electrode pairs. Therefore, in both cases, when the effective value of the voltage applied in the electric field between electrode pairs is fixed to become one-half of the VP, then provided the applied voltage is sufficient to attain the required threshold level for the liquid crystal, observer will perceive the display elements turn ON or OFF in accordance with the changes in the six kinds of combinations of pulses as shown in the table in FIG. 22.

Herein this table, ON represents that display elements are in turned ON state and OFF represents that display elements are in turned OFF state. The display elements which are now turned ON exhibit perceivable effect of light-scattering or light transmission, in the case of the liquid crystal of dynamic scattering mode, or perceivable field effect in the case of the liquid crystal of the field effect mode such as the twisted nematic mode. And the display elements which are now turned OFF exhibit little or no change in the degree of these effects.

These pulse signals for driving the display elements are controlled by the control pulses which are arranged in the counter-decorder 35 so that all the segment and common electrodes are respectively applied proper pulse signals selected in a predetermined intervals so as to combine these pulse signals to be applied across the common and segment electrodes. The pulse signals given to the segment electrodes comprise VSeg 1 and VSeg 2, each of which is supplied repeatedly in respective period regulated by said control pulses during the predetermined repeated cycles, while the pulse signals given to the common electrodes comprise VCom 1, VCom 2, VCom 3, each of which is also applied repeatedly in like manner to be controlled by said control pulses. These pulse signals thus controlled are applied to each of the display elements by way of the driver 36.

For every one minute information, all of the five kinds of pulse signals as stated above are used. Two of the five pulse signals are combined to make six kinds of ON and OFF states on each display element to perform accumulative display. The accumulative display of the display elements for minute information is described hereinafter. At the beginning, all of the common electrodes within all blocks of the display body 2 are set to be applied the pulse signal VCom 3, and all of the segment electrodes are set to be applied the pulse signal VSeg 2. At this time, all display elements in the display body are in OFF state as shown in FIG. 22. On starting operation, the pulse signal applied to the common electrode (hereinafter referred to as common pulse signal) within the first block is switched from VCom 3 to VCom 2, while the rest of the common electrodes are still being fed with the pulse signal VCom 3. The pulse signal applied to the segment electrode (hereinafter referred to as segment pulse signal) is switched from VSeg 2 to VSeg 1 one by one in the order of MS1, MS2, MS3, MS4, MS5. Then each display element within the first block shifts from the OFF state to the ON state in due order to perform accumulative display. During this time, as all corresponding segment electrodes symmetrically positioned in the subsequent block, i.e., from the second block to the twelfth block are interconnected electrically through said connection leads in series as stated before, they will naturally receive the same shifted pulse signal VSeg 1, when the pulse signal applied to the corresponding segment electrode in the first block is shifted from VSeg 2 to VSeg 1. However, all common electrodes for these subsequent blocks carry a common pulse signal of VCom 3. Therefore, each display element within the subsequent blocks uniformly keeps OFF state as shown in FIG. 22. When all display elements within the first block have been turned ON, the common pulse signal applied to the block is switched from VCom 2 to VCom 1, and simultaneously the segment pulse signal returns altogether from VSeg 1 to VSeg 2. At the same time, the common pulse signal applied to the second block is converted to VCom 2 from VCom 3 and the segment pulse signal is switched from VSeg 2 to VSeg 1 one by one in the order to MS5, MS4, MS3, MS2, MS1. Then each display element within the second block shifts from OFF state to ON state in due order to perform accumulative display. All the while, all display elements within the first block keep ON because the common electrode of the first block is applied a pulse signal VCom 1. In the same manner, when all display elements within the first and the second blocks have been turned ON and the accumulative display has been performed, the common pulse signal for the second block is converted to VCom 1 and simultaneously the segment pulse signal returns altogether to VSeg 2 in like manner as in the first block. At that time, the common pulse signal for the third block is switched from VCom 3 to VCom 2 and the segment pulse signal is switched from VSeg 2 to VSeg 1 one by one in the order of MS1, MS2, MS3, MS4, MS5. Then each display element within the third block is turned ON in due order to perform accumulative display. During this time, all display elements within the first and the second blocks keep ON, and all display elements within the subsequent blocks from the fourth to the twelfth are in OFF state as shown in FIG. 22 due to the pulse signal VCom 3 applied to the respective common electrodes. When all display elements within the third block have been turned ON, all display elements within the first through the third blocks are keeping ON state so that the time display device can perform accumulative display. This process goes forward in the same manner as described above. Namely, synchronizing with the time, the common pulse signals within each block being switched from VCom 3 to VCom 2 and the segment pulse signal being switched from VSeg 2 to VSeg 1 one by one, each display element within each block is turned ON in due order. After the ON state has reached the last display element within each block and the moment immediately before the ON state is proceeding to the first display element within the next block, the common pulse signal and the segment pulse signal of the preceding block are altogether switched respectively from VCom 2 to VCom 1 and from VSeg 1 to VSeg 2, while common pulse signal of the succeeding block is also switched from VCom 3 to VCom 2. In this way, subsequent display elements in OFF state are turned ON one by one to make accumulative display keeping each display element of each block which has already been turned ON in the ON state. When the ON state of each display element advanced to cover the final display element in the final block, that is, when one cycle of the accumulative display is completed, the common pulse signal applied to all of the common electrodes of all blocks and the segment pulse signal applied to the segment electrodes are altogether switched respectively to VCom 3 and VSeg 2, then return to the initial condition. As a result, all the display elements are turned OFF at the same time, and simultaneously the first display element within the first block is turned ON thus starting the accumulative display again. Such switching operation for the common pulse signals and the segment pulse signals mentioned above are controlled by the control pulses produced within the minute counter-decoder in the counter-decoder 35.

For hour information, four kinds of pulse signals VSeg 1, VSeg 2, VCom 2, VCom 3, are used, two pulse signals of which are combined to make four types of ON and OFF states on each display element causing only one of the display elements to be turned ON at a time. The pulse signal VCom 1 is not necessary for hour information, because it does not make accumulative display. For every five minutes information, three kinds of pulse signals, VCom 1, VCom 2, VCom 3, are likewise applied to each common electrode alternately for every predetermined period, because the common electrodes are disposed in the same manner as in the case of every one minute information. The sole segment electrode MS6 always has the pulse signal VSeg 1 applied. Then each display element is turned ON every 5 minutes in sequence, resulting in accumulative display. For second information, the segment electrode SS always has the pulse signal VSeg 1 applied, because the segment electrode SS is connected with the contact No. 4 by way of the segment electrode MS6 for the time display body presenting every five minutes information, and connected directly with the same contact No. 4 for the time display body presenting every 1 minute information. To the common electrode SC, VCom 1 and VCom 3 are alternately applied; thus the second display element is turned ON or OFF every second.

Further, the electronic watch of the present invention is equipped with a time reset means 15. It consists of three time reset switches to adjust the hour, minute and second individually. When an hour reset switch is switched on, the ON state of the hour display section begins to travel through the hour display sections rapidly. When the ON state comes to the desired section, the hour reset switch is switched off. Then the ON state stops travelling to represent the hour of the day. If a minute reset switch is switched on, the minute display sections which are turned ON are rapidly added one after another. When the ON sections are accumulated to the desired section, the minute reset switch is switched off. Then the addition of the ON sections stops and the end section which has been turned ON represents the minute of the hour. In this minute reset, even if the ON state reached the final section, that is, 60 minutes are considered to have passed, it is not counted up to the hour, but only the initial display section is kept turned ON and other display sections are all turned OFF. Then the aforementioned accumulative display process is repeated. Lastly, when a second reset switch is switched on, the regular blink presenting second information stops and the second counts return to zero. Then, when the second reset switch is switched off in accordance with the radio time signal, the second display section begins to count second again to represent correct time. In these embodiments, date information is eliminated from the time display. However, it can be performed, only if a display section for date information is properly provided in the time display body 2 and a pulse signal for date information is applied to the section from the LSI through the leads 17.

As detailed hereinbefore, the present watch can be provided with a time display comprising a plurality of display sections with various shapes and areas for hour, minute and second informations. Each section can be freely and beautifully designed and disposed so that the time can be readout easily. Therefore, the present liquid crystal watch can afford a novel time display which has not been seen in conventional display devices.

Further, the present watch reduces the number of necessary leads by interconnecting each electrode constructing display elements in a predetermined order as set forth hereinbefore.

Still further, the present watch does not require any hand or time indicating mark because of its unique display technique, in which each display element, in particular, display elements for minute indication are turned ON sequentially and accumulatively enabling to identify the time more accurately and easily.

Still further, the time display device according to the present invention can be miniaturized by employing an LSI comprising an integrated electronic circuits for driving the liquid crystal display elements so that it can be applied to a wrist watch.

Stil further, the time display body of the present watch is provided with a plurality of contacts on its back face so that the time display body is separable from the watch body at these contacts. Thus the present watch not only complements the disadvantages caused by degradation of liquid crystals, but allows wearer to select a time display body which suits his taste from among various time display bodies and to fix it to his watch by himself.

It will thus be seen that the objects set forth above among those made apparent from the preceding description are efficiently attained and since certain changes may be made in the electronic watch for the liquid crystal without departing from the scope of the invention, it is intended that all matters contained in the above description or shown in the accompanying drawings shall be interpreted as illustrative and not in a limiting sense.

What is claimed are:

1. An electronic time display device comprising a case, a source of electric power, a time base, an electronic circuit and a time display body wherein said time base generates time output pulses with a prime frequency, said electronic circuit including means for producing a plurality of pulses suitable for driving display sections and means for producing a plurality of control pulses to control said plurality of pulses, said time display body comprising a plurality of liquid crystal display sections to create a time display pattern representing an analogical time indication, said plurality of liquid crystal display sections including hour information display sections and minute information display sections, said hour and minute information display sections including segment electrodes and common electrodes, and said segment electrodes and common electrodes in blocks, said blocks including boundaries defined by said common electrodes, said hour information segment electrodes positioned symmetrically within the boundaries of said blocks; each said block including a plurality of segment electrodes; a plurality of said segment electrodes electrically connected in series with a selected segment electrode in an adjacent block, said minute information segment electrodes positioned symmetrically within the boundaries of said blocks; each said block including a plurality of segment electrodes; a plurality of said segment electrodes electrically connected in series with a selected segment electrode in an adjacent block.

2. An electronic time display device as set forth in claim 1 wherein said time display body comprises a liquid crystal display cell equipped with a nematic liquid crystal confined between a pair of electrode plates, said electrode plates coated with a plurality of electrodes on their opposing surfaces.

3. An electronic time display device as set forth in claim 1, wherein said display body includes a plurality of input terminals disposed on its back face which are connected respectively with said plurality of electrodes through leads, said display device further includes means for interconnecting said electrodes with corresponding output terminals of said electronic circuit.

4. An electronic time display device as set forth in claim 2, wherein said nematic liquid crystal comprises a nematic liquid crystal with the field effect mode.

5. An electronic time display device as set forth in claim 2, wherein said nematic liquid crystal comprises a nematic liquid crystal with the dynamic scattering mode.

6. An electronic time display device as set forth in claim 4, wherein said display body includes a pair of polarizing plates one each located outward of said liquid crystal display electrodes.

7. An electronic time display device as set forth in claim 6, wherein said pair of polarizing plates comprises at least one dichromatic polarizing plate.

8. An electronic time display device as set forth in claim 3, wherein said input terminals are a plurality of conductive rubber contacts.

9. An electronic time display device as set forth in claim 1, wherein said plurality of liquid crystal display sections includes one segment electrode for 5 minutes information and 12 common electrodes for 5 minutes information which are positioned to correspond to said one segment electrode.

10. An electronic time display device as set forth in claim 1, wherein said plurality of liquid crystal display sections includes a pair of segment and common electrodes for second information having opposing surfaces.

11. An electronic time display device as set forth in claim 1, wherein said liquid crystal display sections include 12 segment electrodes and four common electrodes for hour information, 60 segment electrodes and 12 common electrodes for minute information and a pair of segment and common electrodes for second information.

12. An electronic time display device as set forth in claim 1, wherein said liquid crystal display sections include 12 segment electrodes and four common electrodes for hour information, one segment electrode and 12 common electrodes for 5 minutes information and a pair of segment and common electrodes for second information.

13. An electronic time display device as set forth in claim 1, wherein said electronic circuit is provided with an LSI.

14. The invention of claim 1 wherein the number of common electrodes for minute information multiplied by the number of blocks of segment electrodes for minute information is equal to the number of display sections for minute information.

15. The invention of claim 1 wherein the number of common electrodes for hour information multiplied by the number of blocks of segment electrodes for hour information is equal to the number of display sections for hour information.

16. The invention of claim 14 wherein the number of common electrodes for hour information multiplied by the number of blocks of segment electrodes for hour information is equal to the number of display sections for hour information.

17. The invention of claim 1 wherein one segment electrode in each minute information block is connected in series with a corresponding electrode in all minute information blocks and one segment electrode in each hour information block is connected in series with a corresponding electrode in all hour information blocks.

18. The invention of claim 1 including leads extending from all electrodes, none of said leads crossing each other.

19. The invention of claim 6 wherein said polarizing plate's planes of polarization intersect at right angles.

20. The invention of claim 6 wherein said polarizing plate's planes of polarity are aligned parallel to each other.

21. The invention of claim 1, wherein said plurality of liquid crystal display sections for hour information comprise 12 display sections for hour information which contain 12 segment electrodes and four common electrodes, said 12 segment electrodes positioned in four blocks, each said block comprising three segment electrodes.

22. The invention of claim 1 wherein said control pulses control the application of one control pulse selected from two different pulses, said selected pulse applied selectively and continuously and successively to each said hour information segment electrode, said control pulses further control the application of one control pulse selected from three different pulses, said selected pulse applied selectively continuously and successively to each said hour information common electrode, whereby each of said display sections for hour information is turned on individually one by one.

23. The invention of claim 1, wherein said plurality of liquid crystal display sections comprise 60 display sections for minute information which include 60 segment electrodes and 12 common electrodes, and said 60 segment electrodes contained in 12 blocks, each said block including five segment electrodes.

24. The invention of claim 1 wherein said control pulses control the application of one control pulse selected from two different pulses, said selected pulse applied selectively and continuously and successively to each said minute information segment electrode, said control pulses further control the application of one control pulse selected from three different pulses, said selected pulse applied selectively continuously and successively to each said minute information common electrode, whereby each of said display sections for minute information is turned on sequentially and acccumulatively one by one.

25. The invention of claim 9 wherein said control pulses control the application of control pulses selected from two different pulses said pulses applied selectively and continuously to said minute information segment electrode, said control pulses further control the application of one control pulse selected from three different pulses, said selected pulses applied selectively and continuously to said minute information common electrode whereby each of said display sections for 5 minute information is turned on sequentially and accumulatively one by one.

26. An electronic wrist watch comprising a case, a source of electric power, a time, base, an LSI incorporating an electronic circuit, a time display body, wherein said time base generates time output pulses with a prime frequency, said electronic circuit including means for producing a plurality of pulses suitable for driving display sections and means for producing a plurality of control pulses to control said plurality of pulses, said time display body comprising a plurality of liquid crystal display sections to create a time display pattern representing an analogical time indication, said plurality of liquid crystal display sections including 12 display sections for hour information which include 12 segment electrodes and four common electrodes; said 12 segment electrodes positioned in four blocks each block containing three segment electrodes; each of said four common electrodes arranged to correspond to said three segment electrodes within each said block, and 60 display sections for minute information which include 60 segment electrodes and 12 common electrodes; said 60 segment electrodes positioned in 12 blocks so that each block contains five segment electrodes; each of said 12 common electrodes arranged to correspond to said five segment electrodes within each said block, each said block including boundaries defined by said common electrode, each of said segment electrodes within each block being interconnected electrically in series through connection leads, said connection leads connecting each of the segment electrodes within an adjacent block, said each of connection leads arranged in series circuitry meandering through all corresponding blocks, said segment electrodes symmetrically positioned with respect to the boundary of each of said blocks, and at least said control pulses controlling minute information and hour information controlling the application of one control pulse selected from two different pulses, said selected pulse applied selectedly and continuously and successively to said segment electrodes, and said control pulse further controlling the application of one control pulse selected from three different pulses, said selected pulse applied selectively continuously and successively to each said common electrode, whereby at least each of said display sections for minute information is turned on sequentially and accumulatively one by one.

27. The invention of claim 26 wherein none of said connection leads crosses each other.

* * * * *